Figure 1:
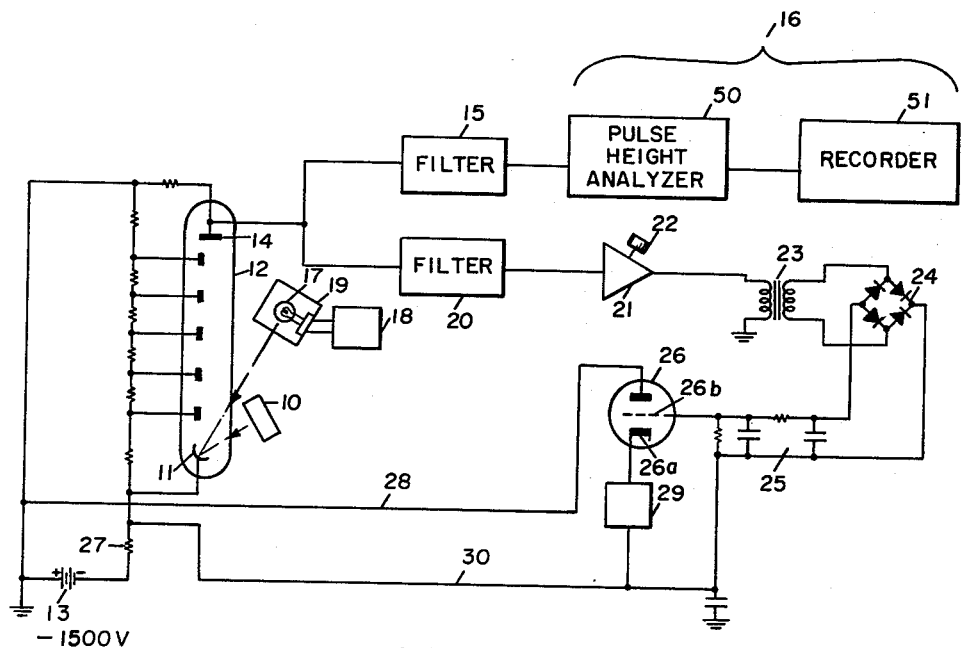

May 11, 1965 W. F. BALDWIN 3,183,353
GAIN-STABILIZED SCINTILLATION DETECTION SYSTEM
Filed May 24, 1962

3,183,353
GAIN-STABILIZED SCINTILLATION
DETECTION SYSTEM
Willett F. Baldwin, Dallas, Tex., assignor to Socony
Mobil Oil Company, Inc., a corporation of New York
Filed May 24, 1962, Ser. No. 197,446
7 Claims. (Cl. 250—71.5)

This invention relates to a system which include photomultipliers and more particularly to an improved arrangement for stabilizing such systems for variations in gain of the photomultipliers. It is an object of the present invention to provide an improved gain-stabilized photomultiplier system for use with light sources of the scintillation type.

Photomultiplier tubes have been widely utilized in recent years in conjunction with sources of light, such as scintillation crystals, in radioactive logging systems for the determination of characteristics of earth formations traversed by a wellbore. In a typical system for the radioactive logging of formations, there are included a source of primary radiation (either neutrons or gamma rays) and a detector of gamma rays which may be a sodium iodide (thallium activated) crystal producing light scintillations upon interaction of gamma rays with the crystal. A photomultiplier tube, whose face is immediately adjacent the crystal and is general shielded from other sources of light other than those emitted by the crystal, is connected in turn to a pulse-height analyzer either of the single-channel or multichannel type, depending upon the type of analysis to be conducted.

In such system, the evaluation of the log is predicated upon the heights and numbers of pulses recorded by the analyzer system. Instrumental stability is necessary. Variations in gain stability of components comprising the system during the course of logging will introduce error, leading to misinterpretation of actual formation conditions.

Thus, gain stability is a major criterion for accurate logging operations; and the most unstable component in the system is the photomultiplier tube. Variations in photomultiplier gain are occasioned by a number of factors including temperature variation and length of service of the tube. In addition, it has been found that a photomulltipier is subject to fatigue, that is, the gain of a photomultiplier tube will materially decrease upon the change from a fast count rate environment to a slow count rate enviroment. This, in and of itself, is undersirable; but an insidious feature of the photomultiplier gain is that it will reestablish itself to a former level after exposure to the lower counting rate environment. There is no indication of when the change in gain ocurs. Thus, the gain of a photomuliplier tube not only tends to decrease but also to vary about an established average level.

Efforts have been made in the past to stabilize the gain of photomultiplier tubes. These have taken the form of a supplementary light source of controlled intensity and frequency which is employed as a control for maintaining the gain of the photomultiplier tube about a set point. However, in all instances the light source has been of a band of frequencies different from the frequencies of light emitted by crystal scintillation. I have found that in order to control the gain of a photomultiplier tube the frequency of light employed for control purposes must match the frequency of the light pulses to be analyzed.

In accordance with the present invention, the control light is of a frequency substantially matching that of the frequency of light scintillations emitted by the source of light to which the photomultiplier tube responds.

More particularly, in accordance with the present invention there is provided a scintillation detecting assembly which comprises a scintillation means responsive to radioactive particles for producing pulses of light energy of a given wave-length band. A light amplifier is responsive to said light energy. A second source of light is provided whose wavelength band substantially matches that of the light pulses and whose intensity is substantially constant. Both the regulating light and the light pulses are applied to the light amplifier. In one embodiment of the invention the light amplifier was a photomultiplier tube.

Further in accordance with the present invention, there is provided a system for controlling the gain of a counting system comprising a scintillation detecting assembly including a scintillating means for emitting light pulses in response to impingement thereon of radioactive particles. A means is provided responsive to the light pulses for producing electric pulses corresponding in number to said light pulses. The light pulses are possessed of a predetermined wavelength band. Another means is provided for applying control pulses of light whose wavelength band substantially matches that of said light pulses emanating from the light-emitting means and whose repetition rate is significantly different from that of the light pulses. A means is responsive to the control pulses for varying the gain of the counting system upon variation of the amplitude of electric pulses representative of the control pulses so as to stabilize the gain of the system at a predetermined level.

Figure 2:
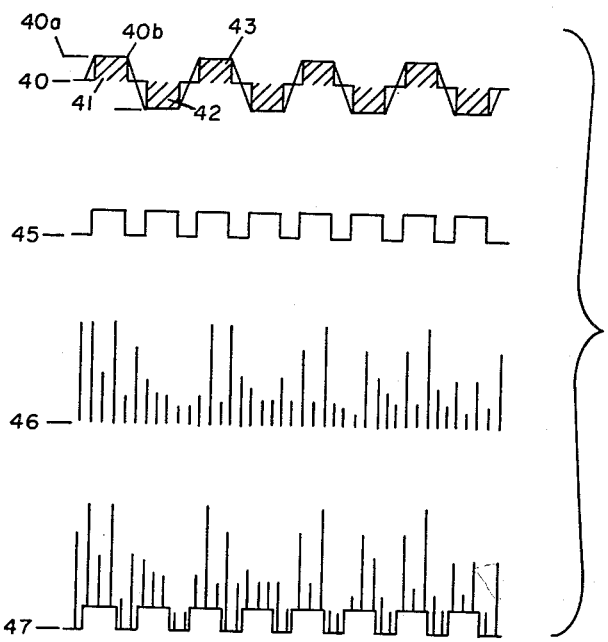

For further objects and attendant advantages of the present invention, reference may be had to the following detailed description taken in conjunction with the accompanying drawings wherein:

FIGURE 1 schematically illustrates a scintillation counting system embodying the present invention; and FIGURE 2 illustrates waveforms helpful in the understanding of the present invention.

Referring now to the drawings and more particularly to FIGURE 1, there is disclosed a scintillation counting system wherein light impulses from a source 10, which may be a scintillating crystal, are applied to the photosensitive cathode 11 of a photomultiplier tube 12. The electrons released from the photosensitive cathode 11 are multiplied as they traverse the photomultiplier tube 12 under the influence of an accelerating voltage from a source 13 to produce at the anode 14 voltage impulses of significant magnitude. The impulses are then applied by way of a high-pass filter 15 to a suitable utilization device 16.

It has been found that the gain of a photomultiplier tube is sensitive to and will vary upon change in temperature, age of the tube, and the rate at which the light impulses impinge upon the photosensitive cathode. These are merely some of the factors that render the gain of the photomultiplier tube unstable and therefore render unreliable the results for many types of analysis. For example, where the photomultiplier tube will be used in a logging system for determination of the characteristics of the earth formations traversed by a borehole, the source of light 10 will take the form of a scintillation crystal, such as sodium iodide (thallium activated), which produces flashes of light whose intensity is proportional to the energy of the nuclear radiation impinging upon the crystal. With the gain of the photomultiplier tube stable, the magnitude of the voltage pulses appearing at the anode 14 will be proportional to the intensity of the light impulses from the crystal 10 and thus the voltage pulses may be employed to identify that character of the earth formation that gave rise to or affected the nuclear radiation impinging upon the crystal. It is obvious now that any uncontrolled variation in gain in the system will lead to erroneous analysis in that reliance is had upon the height as well as the number of voltage impulses appearing at the anode 14 of the photomultiplier tube 12.

In accordance with the present invention, the gain of the photomultiplier tube 12 is maintained stable and otherwise constant by an arrangement including a secondary light source 17 which is employed in conjunction with a feedback control system for controlling the magnitude of accelerating voltage applied from the source 13 and thus controlling the gain of the photomultiplier tube 12.

In order to obtain accurate gain control and as described in detail hereinafter, the light from the secondary source 17 must match in frequency band the light emitted from the source 10. The light source 17, mounted in a suitable housing 19, is excited from an alternating current source 18. The source 18 is regulated so that the amplitude of voltage pulses applied therefrom, as well as their repetition rate, is constant. While the repetition rate may vary somewhat, it is important that the amplitude be constant. A small beam of light pulses now emanating from the secondary or control source 17 is applied by way of a small aperture in housing 19 to the photosensitive cathode 11. These light pulses, of repetition rate and duration substantially different with respect to the repetition rate and duration of impulses from the primary source 10, again cause electrons to be released from the photosensitive cathode 11 which are multiplied under influence once more of the accelerating voltage from the source 13 and appear as pulses at the anode 14. These pulses are now applied for control purposes by way of a low-pass filter 20 to an amplifier 21. The amplifier, under influence of its own gain control as represented by knob 22, increases the gain of the signal and applies it to the primary of a coupling transformer 23. The impulses are now rectified by rectifier 24 connected to the secondary of the transformer 23. Ripple in the rectified signal is filtered out by a filter network 25 and the D.-C. signal applied to the grid of a control element, here illustrated as a regulator tube 26.

The amount of current flowing through the regulator tube 26 will affect the voltage applied as an accelerating voltage to the photomultiplier tube 12 and thus can be an effective gain control. More particularly, the voltage regulator tube 26 is connected in circuit with the source 13 and an impedance 27. The anode of the regulator tube 26 is connected by way of conductor 28 to the positive side of source 13 which is grounded. The cathode of the regulator tube 26 is connected by way of a voltage reference control element 29 and thence by way of conductor 30 to one end of the impedance 27. The opposite end of the impedance 27 is connected to the negative side of the source 13. It is now evident that current flowing through the regulator tube 26 will also flow through the resistance or impedance element 27 and thus will determine the voltage drop across that impedance. An increase in current flow through the regulator tube 26 will increase the voltage drop across the resistance 27 to decrease the potential difference between the cathode 11 and the anode 14 of photomultiplier tube 12. This in effect reduces the gain of the photomultiplier tube. On the other hand, a decrease in current through the tube 26 will have the effect of increasing the gain of the photomultiplier tube.

The voltage reference control element 29 provides in effect a comparison voltage with which the D.-C. signal from rectifier 24 is compared. In one embodiment of the present invention, the reference control was provided by a Zener diode which maintained a 100-volt potential difference between the cathode 26a of tube 26 and conductor 30. The system was calibrated initially by adjusting the gain of amplifier 21 such that the D.-C. signal from rectifier 24 was +98 volts. With a potential of −1000 volts on conductor 30, the potential applied to the grid of tube 26 was −902 volts. Since the control element maintained a difference of 100 volts between cathode 26a and conductor 30, the cathode was at a potential of −900 volts. The net effect was to bias the grid at a potential of −2 volts with respect to the cathode.

With the elements connected as shown, the accelerating voltage applied to the tube 12 will be controlled to stabilize the gain should the gain tend to change for any of the reasons above enumerated. For example, should the gain begin to decrease, the D.-C. potential at the output of rectifier 24 would decrease, thus rendering the grid 26b of tube 26 more negative with respect to the cathode 26a. This increase in grid bias would decrease the current flow through the tube 26, thus decreasing the voltage drop across resistor 27 and causing the potential difference across the photomultiplier tube 12 to increase thereby to increase the gain and return it to its former level.

The source 18 for exciting the lamp 17 is regulated and may be one of many types well known to those skilled in the art. The amplitude of output signal is very carefully regulated to be substantially constant. The output signal as represented by waveform 40, FIGURE 2, is preferably a clipped sine wave having a frequency for reason of convenience of 60 cycles per second. The clipped sine wave output was selected for ease of regulation.

It will be recalled that the frequency of the control light 17 must match, as closely as possible, the frequency of the light source 10. The control light 17 whose frequency closely matched that of source 10 was a blue glow lamp, Type Signalite–90ST25, available from Signalite Inc., Neptune, New Jersey. Frequency matching may be provided by either filtering the light from the source 17 or providing by other means a light source whose frequency as produced is within this frequency range. In one embodiment of the present invention wherein the source 10 was a scintillation crystal of sodium iodide (thallium activated) employed to detect gamma rays, the light scintillations from source 10 had a wavelength of 4100 Angstroms.

One of the characteristics of a glow lamp is that it is possessed of sharp cutoff and ignition characteristics and will respond to both negative-going and positive-going impulses to generate pulses of light of the type shown within waveform 40, FIGURE 2. More particularly, as the voltage of waveform 40 increases and attains a value at voltage point 40a, the lamp 17 will turn on and will continue on until the waveform 40 drops below voltage point 40b. The net effect is a series of light impulses 41, 42, 43, etc. of substantially constant intensity and of frequency twice that of the energizing signal. For example, with the signal generated having a frequency of 60 cycles, the light impulses will be generated at a rate of 120 cycles. As the light impulses 41, 42, 43, etc. impinge upon the photosensitive surface of cathode 11, the electrons released will be of a form shown in waveform 45, FIGURE 2, of constant amplitude and a frequency of 120 cycles. At the same time, the light impulses from the crystal 10 impinge upon the photosensitive cathode 11 and produce a series of light impulses of frequency significantly higher than that of the control pulses of waveform 45 and of magnitude that varies with the energy of the gamma rays impinging upon the crystal. The resultant train 46 of pulses is also amplified in the photomultiplier tube 12, and the composite waveform comprised of a combination of waveform 45 and train 46 appears as waveform 47 at the anode of photomultiplier tube 12.

The composite, or combined, waveform 47 is now filtered by high-pass filter network 15 and low-pass filter network 20 respectively to apply the train 46 to the utilization device 16 and to apply the waveform 45 to the amplifier 21 for control purposes.

The utilization device 16 may be any type of recording or analysis instrumentation, depending upon the use to be made of and the origin of the primary energy giving rise to scintillations of the crystal 10. For example, the utilization device 16 may include a pulse-height analyzer 50 of the single-channel or multi-channel type and a recorder 51 which may be of the X–Y type where spectral analysis is involved or of the strip-chart type where the crystal detector forms part of a radioactive logging system and the scintillations from the crystal are recorded with respect to depth or position of the crystal in a wellbore.

With the control impulses of waveform 45 applied to the gain-control system including tube 26 and because the control impulses are derived from a light source whose color spectrum matches or substantially matches that of the spectrum of light scintillations derived from the source or crystal 10, the gain of the photomultiplier tube 12 will be maintained substantially constant throughout the period of its life and despite changes in environment which otherwise tend to vary the gain of a photomultiplier tube.

Now that one embodiment of the invention has been fully described, modifications will occur to those skilled in the art and it is intended to cover all such modifications as fall within the scope of the appended claims.

What is claimed is:

1. A scintillation detecting assembly comprising:
   (a) a scintillation means responsive to radioactive particles for producing pulses of light energy of a given wavelength band,
   (b) a light amplifier,
   (c) a source of light whose wavelength band substantially matches that of said light pulses and whose intensity is substantially constant, and
   (d) means for applying said light and said light pulses to said light amplifier.

2. The scintillation detecting assembly of claim 1 wherein said scintillation means is a sodium iodide crystal (thallium activated) and said source of light has a wavelength of about 4100 Angstroms.

3. The scintillation detecting assembly of claim 1 wherein said light amplifier is a photomultiplier having a cathode and the light from said source and said pulses of light energy are applied to said cathode.

4. A system for controlling the gain of a counting system comprising:
   (a) a scintillation detecting assembly including a scintillating means for emitting light pulses in response to impingement thereon of radioactive particles,
   (b) means responsive to said light pulses for producing first electric pulses corresponding in number to said light pulses, said light having a predetermined wavelength band,
   (c) means for applying to said light pulse responsive means control pulses of light of constant intensity whose wavelength band substantially matches that of said light pulses emanating from said light-emitting means for producing second electric pulses, and
   (d) means responsive to said second electric pulses for varying the gain of said counting system upon variation in a characteristic of said second electric pulses to stabilize the gain of said system at a predetermined level.

5. A system for controlling the gain of a counting system comprising:
   (a) a scintillation detecting assembly including a scintillating crystal for emitting light pulses of a known wavelength in response to impingement thereon of radioactive particles,
   (b) a photomultiplier having a gain control and responsive to said light pulses for producing electric pulses representative of the character of said light pulses,
   (c) means for applying to said first means control pulses of light of constant intensity whose wavelength band substantially matches that of said light pulses emanating from said crystal and whose repetition rate differs from that of the light pulses from said crystal for producing control voltage pulses, and
   (d) means responsive to said control voltage pulses and in circuit with said gain control for varying the gain of said photomultiplier upon variation in amplitude of said control voltage pulses to stabilize the gain at a predetermined level.

6. A scintillation detecting assembly comprising
   scintillation means responsive to radioactive particles for producing primary pulses of light energy of a given wavelength band,
   a light amplifier,
   a source of light having a wavelength band substantially matching the wavelength band of said primary pulses of light energy and having a substantially constant intensity,
   means for modulating said source of light to produce secondary pulses of light having a repetition rate substantially different from the repetition rate and duration of said primary pulses,
   means for applying said pulses from said scintillation means and from said source to said light amplifier for the production of amplified pulses from said primary and secondary light pulses,
   means connected to the output of said light amplifier responsive only to amplified pulses produced at said repetition rate of said secondary light pulses for developing a control signal proportional to the amplitude of said amplified pulses produced from said secondary light pulses,
   means responsive to said control signal for varying the gain of said light amplifier upon variation in amplitude of said amplified pulses produced from said secondary light pulses to stabilize the gain at a predetermined level, and
   means connected to the output of said light amplifier responsive to amplified pulses having the repetition rate corresponding to that of said primary pulses for producing an output proportional to the quantity of said radioactive materials which produce said primary pulses.

7. A system for controlling the gain of a counting system comprising
   a scintillation detecting assembly including a scintillating crystal for emitting primary light pulses of a known wavelength in response to impingement thereon of radioacitve particles, said light pulses having a repetition rate related to the rate of impingement of said radioactive particles,
   a photomultiplier having a gain control, said primary light pulses being applied to said photomultiplier so that said photomultiplier produces electric pulses representative of the character of said primary light pulses,
   a source of light, said source having a wavelength band which substantially matches that of said primary pulses of light,
   means for modulating said source to produce secondary light pulses having a repetition rate and duration substantially different from the repetition rate and duration of the primary light pulses from said scintillating crystals,
   means for applying said secondary light pulses to said photomultiplier for the production of electrical pulses representative of said secondary light pulses,
   a first filter having a pass band which only passes electrical pulses having the repetition rate and duration of said primary light pulses, said first filter being connected to the output of said photomultiplier,
   a counting device connected to the output of said first filter for obtaining a measurement indicative of the number of pulses emanating from said scintillation crystal,
   a second filter having a pass band which passes only electrical pulses of the repetition rate and duration of said secondary light pulses and blocks electrical pulses of the repetition rate and duration of said primary light pulses, said second filter being connected to the output of said photomultipler, and means responsive to the output of said second filter for varying the gain of said photomultiplier upon variation in amplitude of said electrical pulses representative of said secondary light pulses to stabilize the gain at a predetermined level.

References Cited by the Examiner
UNITED STATES PATENTS

| | | | |
|---|---|---|---|
| 2,412,423 | 12/46 | Rajchman et al. | 250—207 |
| 2,700,108 | 1/55 | Shamos | 250—83 |
| 3,056,885 | 10/62 | Scherbatskoy | 250—71.5 |

RALPH G. NILSON, *Primary Examiner.*

ARCHIE R. BORCHELT, *Examiner.*